US008978451B2

(12) United States Patent
Haimer (10) Patent No.: US 8,978,451 B2
(45) Date of Patent: Mar. 17, 2015

(54) SPINDLE CLAMP

(75) Inventor: Franz Haimer, Hollenbach (DE)

(73) Assignee: Franz Haimer Maschinenbau KG, Hollenbach (DE)

( * ) Notice: Subject to any disclaimer, the term of this patent is extended or adjusted under 35 U.S.C. 154(b) by 366 days.

(21) Appl. No.: 13/499,848

(22) PCT Filed: Oct. 4, 2010

(86) PCT No.: PCT/EP2010/064739
§ 371 (c)(1),
(2), (4) Date: Jun. 25, 2012

(87) PCT Pub. No.: WO2011/039375
PCT Pub. Date: Apr. 7, 2011

(65) Prior Publication Data
US 2012/0279286 A1 Nov. 8, 2012

(30) Foreign Application Priority Data

Oct. 2, 2009 (DE) .......................... 10 2009 048 026

(51) Int. Cl.
| G01M 1/02 | (2006.01) |
| G01M 1/34 | (2006.01) |
| G01M 1/30 | (2006.01) |
| G01M 1/38 | (2006.01) |
| G01M 1/04 | (2006.01) |

(52) U.S. Cl.
CPC . *G01M 1/02* (2013.01); *G01M 1/04* (2013.01); *G01M 1/34* (2013.01)

USPC .................................. 73/66; 73/487; 408/1 R (58) Field of Classification Search
CPC ............ B23Q 1/70; B23Q 1/72; B23Q 3/062; B23Q 3/14; B23Q 1/42
USPC .............. 73/66, 455–487; 409/231, 219–220, 409/225, 163–165; 29/901; 30/521
See application file for complete search history.

(56) References Cited

U.S. PATENT DOCUMENTS

| 2,954,711 | A | * | 10/1960 | Hack .............................. 408/1 R |
| 7,318,346 | B2 | * | 1/2008 | Haimer ........................... 73/462 |
| 2006/0130576 | A1 | * | 6/2006 | Turner et al. .................... 73/462 |
| 2007/0092349 | A1 | * | 4/2007 | Momochi et al. ............. 409/231 |

* cited by examiner

*Primary Examiner* — Peter Macchiarolo
*Assistant Examiner* — Anthony W Megna Fuentes (57) ABSTRACT

The invention relates to a balancing device, having a measuring system for determining the rotational unbalance of a test object, comprising a spindle unit with a spindle, which is intended to hold the test object and rotate it at a test rotational speed, and a spindle mounting, by which the spindle unit is movably anchored on the machine base, such that the spindle unit can oscillate in a predetermined measuring direction as a result of the unbalance forces occurring during the measurement operation, and at least one sensor, which upon rotation of the spindle detects at least one unbalance characteristic variable occurring in the measuring direction, and a material removal system for balancing the test object by material removal in a predetermined site. The measuring system and the material removal system are designed such that material can be removed when the test object is held in the spindle.

9 Claims, 10 Drawing Sheets

SPINDLE CLAMP

FIELD OF THE INVENTION

The invention relates to a balancing machine, also referred to as a balancing device, for determining and eliminating the rotational imbalance of a test piece (in particular in the form of a tool holder).

BACKGROUND OF THE INVENTION

Devices that enable high-precision determination of the amount and location of the imbalance of a tool holder are known, for example, from the German patent application DE 102 33 917 A1.

Once the amount and location of the imbalance have been determined, it is also known to remove some material from a suitable location on the tool holder in order to thus permanently balance the tool holder.

As a rule, the tool holder is unclamped from the balancing machine for this purpose and the necessary amount of material is removed from the predetermined location. The tool holder is then clamped back into the balancing machine to perform a test measurement. The unclamping and reclamping is time-consuming and may compromise measurement accuracy since it is always a possibility that in the course of the reclamping, the tool holder will assume a slightly different position than in the first clamping.

Internally, this has therefore already led to the thought of leaving the tool holder clamped while it is machined in a material-removing way in order to balance it. To this end, the spindle unit must be immobilized so that the forces and vibrations occurring in the course of the material-removing machining do not damage the highly sensitive measuring sensors or the spindle mount of the measuring unit. Furthermore, the spindle unit could move out of the way of the material-removing tool and thus compromise the precision of the material removal if it were not locked in place. Another possibility that has been considered is to achieve this locking function by placing clamping jaws against the spindle unit from two sides, which clamp it between themselves like an external brake drum. Such an approach, however, exerts stress at least on the sensors and therefore also results in measurement inaccuracies.

Furthermore, a clamping device that is attached directly to the spindle unit also prevents a rotary motion of the spindle. Such a rotary motion, however, can be entirely desirable and necessary in certain types of material removal, for example milling a groove along the outer circumference of the test piece.

The object of the invention is to disclose a device with which the rotational imbalance of a tool holder can be determined and eliminated, without having to put up with the problems mentioned above.

SUMMARY OF THE INVENTION

According to the invention, the balancing machine is equipped with a spindle locking mechanism, which is embodied in such a way that the spindle unit can be immobilized so that both while the spindle unit is being clamped in place and while the material is being removed from the tool holder, the spindle mount of the spindle unit or at least the sensor or sensors is/are situated (essentially) outside the flow of force that is produced between the spindle unit and the base of the machine. As a result, neither the forces occurring in the course of the clamping nor the forces subsequently occurring in the course of the material removal affect the spindle mounts that are jointly responsible for the measurement accuracy or at least these forces do not affect the more sensitive sensors. This is because according to the invention, the above-mentioned forces are deflected directly into the base of the machine via the spindle locking mechanism.

The spindle locking mechanism is therefore embodied in the form of a clamping device with which the spindle arrangement can be clamped in position without forcing it to perceptibly change position so that the spindle unit, i.e. the drum in which the spindle is supported and secured to the machine frame, is not able to execute any pivoting or translatory movements. When the clamp is released, however, the spindle unit is suspended solely by its spindle mounts and is thus completely able to oscillate freely.

The clamping device that constitutes the spindle locking mechanism is preferably embodied so that the normal forces—which the clamping jaws exert relative to the clamping surfaces interacting with them—and their resultants have a line of action that does not intersect with the spindle rotation axis. Therefore the spindle unit is not clamped in a fashion similar to an external brake drum, for example, i.e. is not clamped with the aid of at least two clamping jaws that engage opposing circumference regions of the spindle unit on both sides of the spindle rotation axis, thus inevitably forcing the spindle arrangement to change position as soon as it is not situated (due to inevitable, more or less random thermal expansions) absolutely symmetrically between the clamping jaws that are to move toward each other with the clamping action.

The clamping device is preferably embodied so that in the course of clamping the spindle unit, it does not produce any forces in a direction parallel to the direction in which the sensor or sensors react in order to measure the imbalance.

In a preferred embodiment, the spindle locking mechanism has clamping surfaces on which the openable and closable clamping jaws act; the clamping jaws and/or the clamping surfaces are embodied as articulated or flexible so that the clamping jaws, through their action on the clamping surfaces, exert essentially no force on the spindle mount or at least exert no force on the spindle unit that significantly impacts the sensor arrangement. Preferably, the above-mentioned clamping surfaces are embodied on leaf springs, which constitute the clamping strips that are also addressed here.

Such clamping jaws or clamping surfaces, whose positions are never the same due to temperature influences, do not force the spindle unit to execute any perceptible change in position when they rest against the spindle unit. The case is quite the contrary—the spindle unit is relatively heavy and correspondingly inert and thus forces the clamping jaws or clamping surfaces to adapt to it. At this point, it must be remembered that the freedom of movement when the clamping jaws are released is by nature quite small and as a rule, is less than 0.5 mm (0.5 mm to 0.05 mm, preferably about 0.15 mm).

According to a modification of the invention, there are at least two clamping strips whose clamping surfaces are arranged in different planes, preferably extending essentially perpendicularly or obliquely to each other. Generally speaking, there are thus two separate clamping systems, the first of which immobilizes the spindle unit against the action of forces from a first direction and the second immobilizes the spindle unit against the action of forces from a second direction, which differs from the first direction. Preferably, the first direction corresponds to a direction parallel to the rotation axis of the spindle and the second direction corresponds to a direction perpendicular thereto, preferably with the two directions simultaneously also being oriented perpendicular to the measurement direction M of the sensor or sensors. Such an embodiment makes it possible to immobilize the spindle unit in a way that is altogether rigid by clamping the clamping strips in place, even though each of the clamping strips is flexible or elastically resilient in one direction—in this way, the clamping strips reinforce and complement each other in their function. This gives the spindle locking mechanism extremely rigid characteristics and enables a high-precision removal of material from the test piece or tool holder, which improves the quality of its balancing.

Preferably, at least two clamping strips are provided, which are arranged parallel to and spaced apart from each other. Such an arrangement increases the resistance of the spindle locking mechanism to the machining forces produced in the course of the removal of material from the test piece, which have a tendency to tilt the spindle unit.

It is advantageous if the clamping jaws each include a pivoting strip, which has an elastically deformable holding slat around which the pivoting strip is pivoted against the clamping strip in the course of the actuation of the clamping jaw. It is thus possible to eliminate a hinge with elements that move in sliding fashion relative to each other so that the pivoting strip articulates. This improves measurement precision and reliability since it is never possible to completely rule out the fact that a hinge—at least over the long term—will end up having too much play and will thus begin to "rattle" to a minimal degree, which impairs the accurate detection of very small imbalance-induced movements.

In a preferred modification of the invention, at least two clamping jaws are actuated by a shared actuator. Such an embodiment is useful not only because it reduces the number of moving parts, but also because it reduces or eliminates the risk that as the spindle unit is being clamped into position, this very process causes forces to be exerted on the spindle unit so that different actuators generate different forces depending on tolerances.

A particularly preferred modification of the invention features the fact that the actuator actuates the at least one pivoting strip associated with it through the interposition of a force-displacement converter that deflects the actuation force, which the actuator exerts in a first effective direction, in a second effective direction approximately perpendicular thereto before imparting it to the pivoting strip and thus simultaneously converts the lesser force exerted by the actuator along a longer path to a greater force acting along a shorter path.

Ideally, such a force-displacement converter works in accordance with the toggle lever principle, i.e. it acts on a diaphragm or a pivotably articulated rod assembly or a pivotably connected, usually V-shaped plate arrangement in a direction that extends essentially perpendicular to the surface of the diaphragm or to the longitudinal axis of the rod assembly or to the pivot axis of the plate arrangement. It thus forces the diaphragm or rod assembly or plate arrangement to execute a movement that causes the latter to stretch essentially orthogonal to the direction of the impingement. This change in length generates powerful forces that are used to actuate the pivoting strips and to powerfully clamp the clamping strips.

Other advantages, effects, and possible embodiments ensue from the following exemplary embodiments, which are described in conjunction with the figures.

DETAILED DESCRIPTION OF THE PREFERRED EMBODIMENTS

First, a brief general description should be given of the function of the exemplary embodiment presented here for the purpose of further illustrating the invention.

Figure 1:
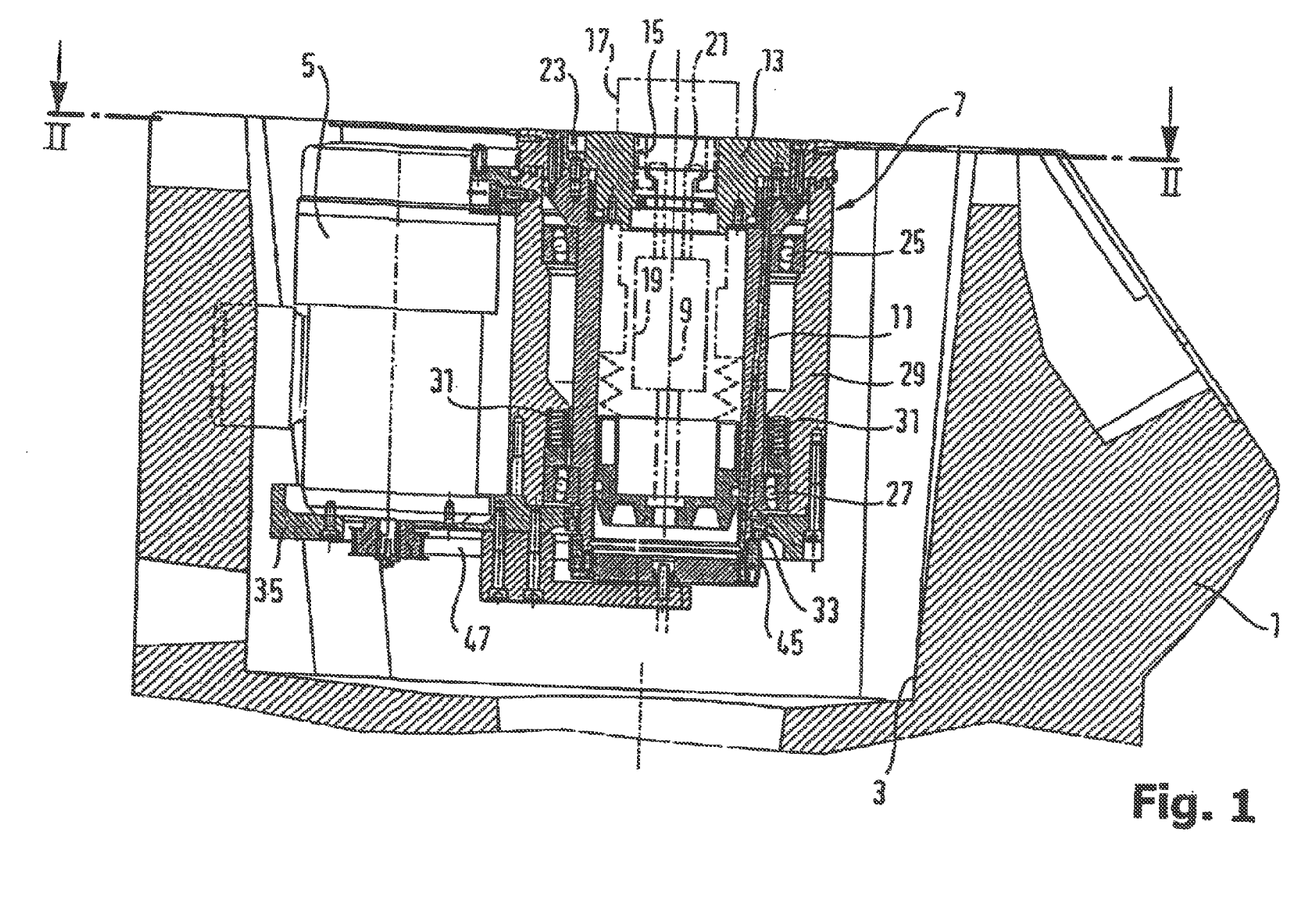
FIG. 1 shows a middle section through an embodiment according to the invention (spindle locking mechanism 64 not shown).
Figure 2:
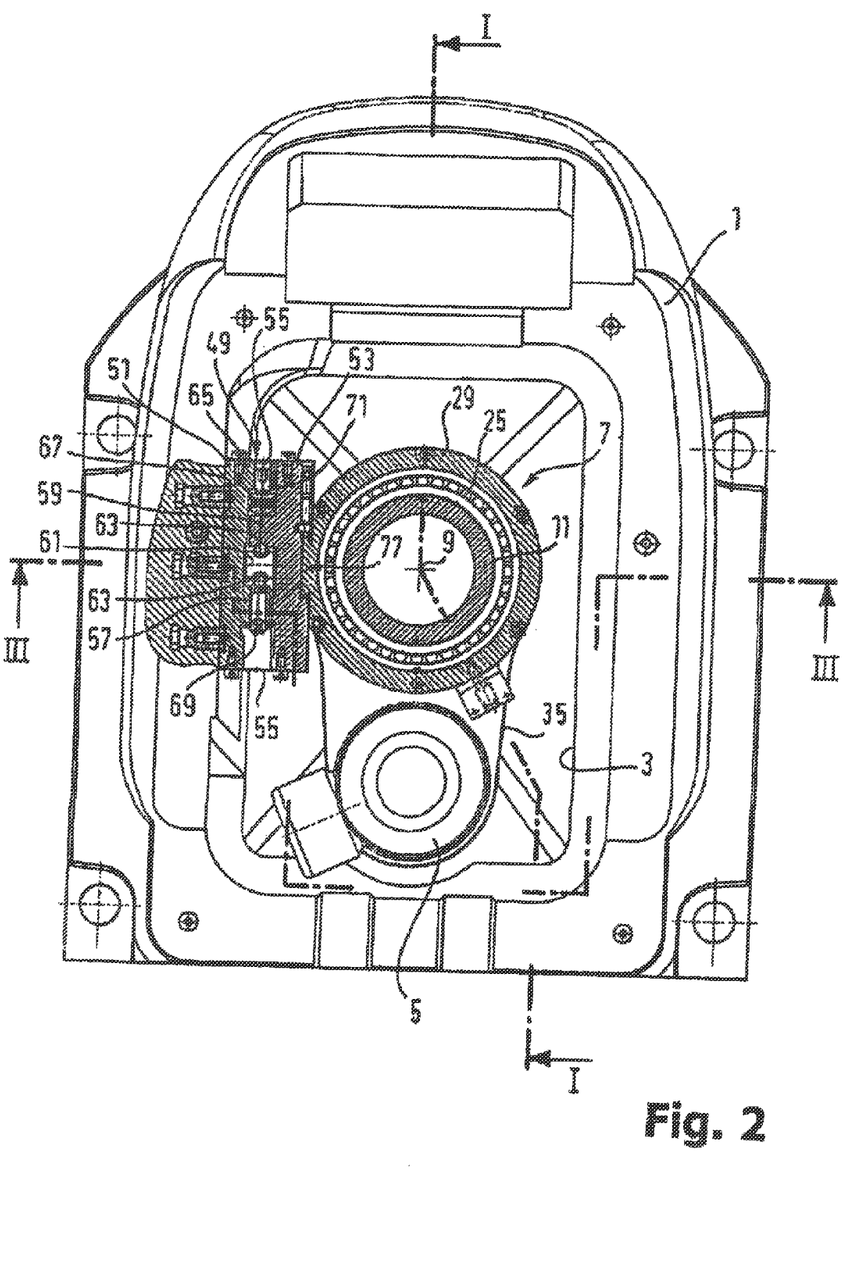
FIG. 2 shows a top-view section through an exemplary embodiment according to the invention (spindle locking mechanism 64 not shown).

The balancing machine shown in an overview in the FIGS. 1 and 2 has a housing 1 serving as the base of the machine. In a chamber 3 that is accessible from above, the housing accommodates a spindle unit 7 that is driven by an electric motor 5. The spindle unit 7 has a rotating spindle 11 whose rotation axis 9 is preferably oriented vertically.

At its upper end, the spindle has a coupling adapter 13, which can be replaced during normal operation and is equipped with a receiving opening centered on the rotation axis 9. This receiving opening is used for connecting a standardized test piece that is to be balanced, which in this case is represented by the tool holder 17. The test piece can be a tool holder, e.g. embodied in the form of a conventional taper or hollow shank taper tool holder (HSK tool holder), or can also be a rotor of a different type.

The subassembly composed of the electric motor 5 and spindle unit 7 in this exemplary embodiment is secured to the housing or the base of the machine 1 by means of a spindle mount 49 detachably affixed to the spindle holder 29.

The spindle mount is embodied so that the spindle unit is able to move slightly in the measurement direction M, but is mounted relatively rigidly in all other directions. Sensors are mounted in the measurement direction to measure the effect of the imbalance of the test piece. This can, for example, be a force, a deflection, or an acceleration, etc.

As a rule, the tool holder to be balanced is attached to the spindle 11 with the aid of the coupling adapter 13, which sets the spindle into rotation. With the help of sensors 61 and a separate device for determining the angular position of the spindle, it is now possible to determine the exact location and amount of the imbalance. The numerical control of the balancing machine calculates how much material and from which location or locations on the tool holder the balancing machine's own material removal device 65 must remove from the tool holder to be balanced in order to achieve the desired balancing quality.

The balancing machine's own material removal device 65 is preferably embodied in the form of a drill, which removes a corresponding quantity of material with the aid of a twist drill. In lieu of this, the material removal can also be performed using other methods such as milling, grinding, etc.

Preferably, the material removal device 65 is situated diametrically opposite from the spindle locking mechanism 64 on the circumference of the spindle unit. The spindle mount 49, however, is situated laterally next to the spindle locking mechanism 64 so that their horizontal center lines enclose a right angle.

The material removal is carried out without detaching the tool holder from the spindle 11. To this end, the spindle drive positions the spindle 11 so that the location on the tool holder at which the material removal is to take place comes to rest positioned exactly under the twist drill, also see FIGS. 4 and 5 in which the material removal device 65 is indicated. The spindle drive is also used to hold the spindle in position during the material removal or to execute a rotary motion of the spindle possibly required for the material removal.

Before the start of the material removal, the spindle locking mechanism 64 according to the invention is activated, which immobilizes the spindle unit 7 so that the forces which the material removal device exerts on the spindle unit either do not cause the spindle unit to move or do not cause it to move in a direction in which the movement would trigger a signal from the sensors. Therefore no significant forces are transmitted to the sensors 61. The special feature of the spindle locking mechanism 64, therefore, is the fact that it locks the spindle unit without this locking process also producing forces that are transmitted to the sensors 61 to more than an insignificant degree. This is achieved by embodying the spindle locking mechanism so that the process of its activation generates only those forces that can be transmitted from the spindle unit to the base of the machine via the spring elements or leaf spring elements 55 that constitute the movable mount of the spindle unit 11, but does not exert any stress on the sensors 61.

Figure 4:
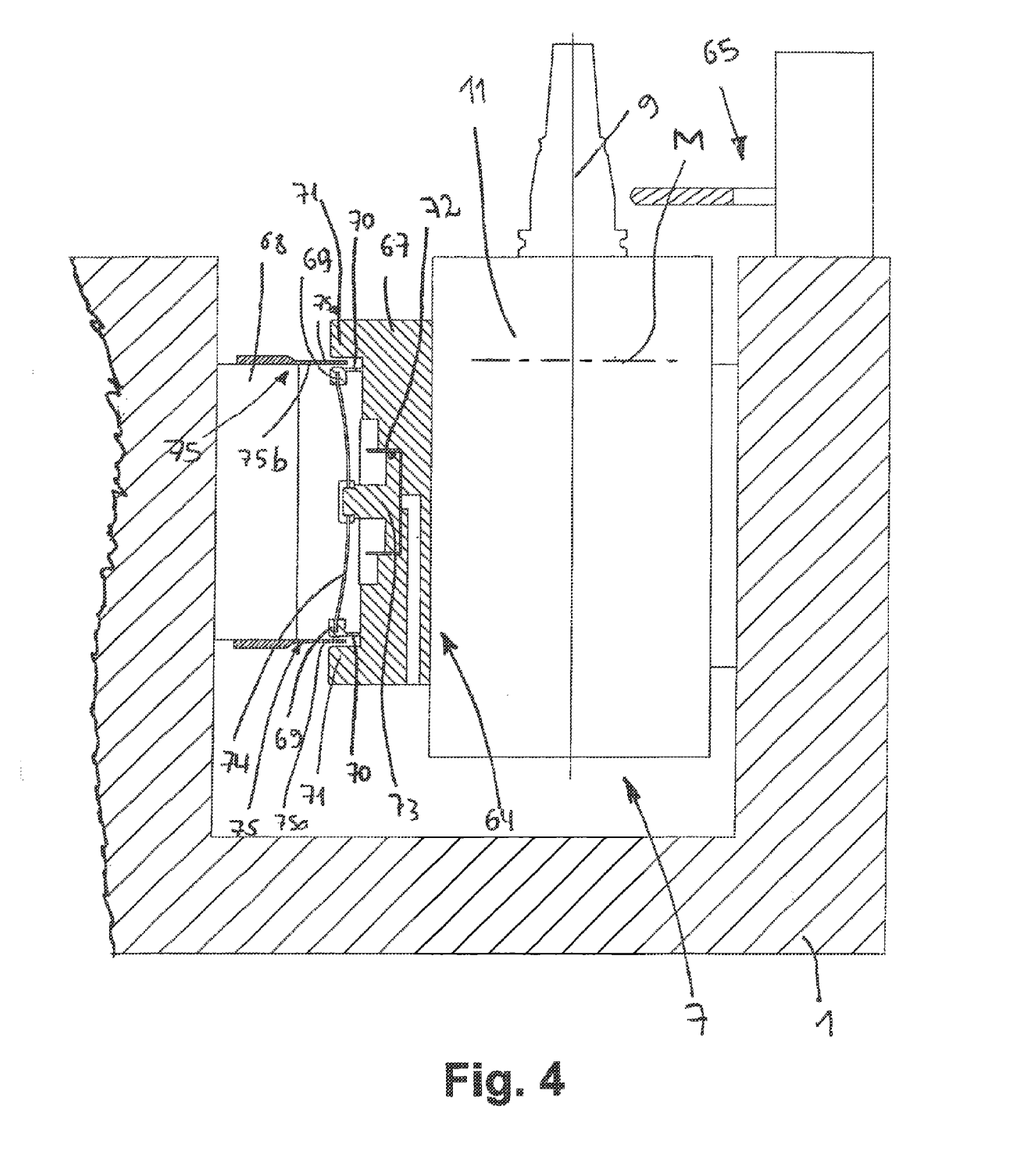
FIG. 4 shows a middle section through the first embodiment, with only a first part (of the spindle locking mechanism) shown in the released state.
Figure 5:
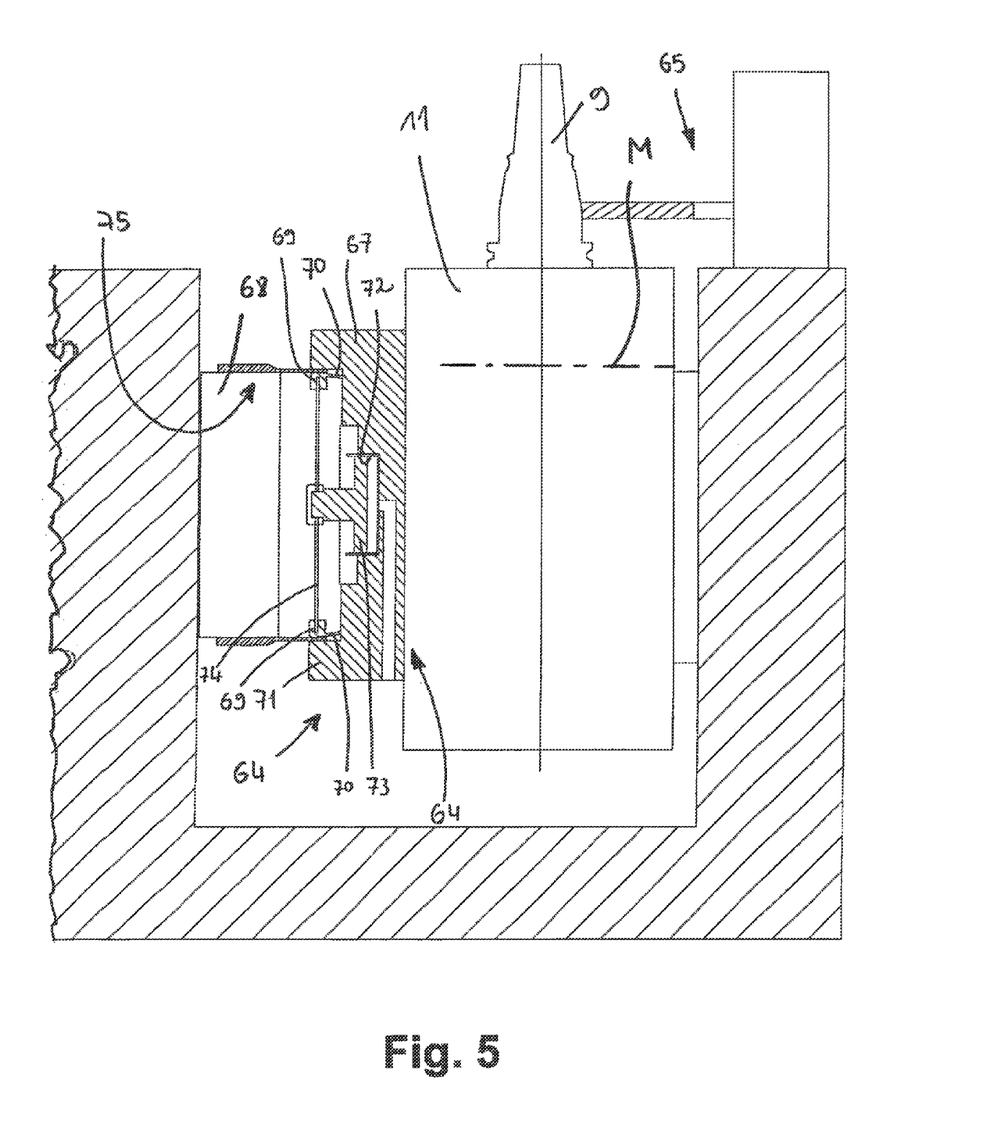
FIG. 5 shows the same middle section through the first embodiment shown in FIG. 4, but in this case, other, second parts of the spindle locking mechanism are shown in the clamped state.

FIG. 4 shows a cross-section through an exemplary embodiment of the spindle locking mechanism 64 according to the invention, but not all parts of the spindle locking mechanism 64 are visible.

The base of the machine 1, the spindle unit 7, the rotation axis 9 of the spindle, and the not yet activated material removal device 65 are immediately apparent.

Figure 3:
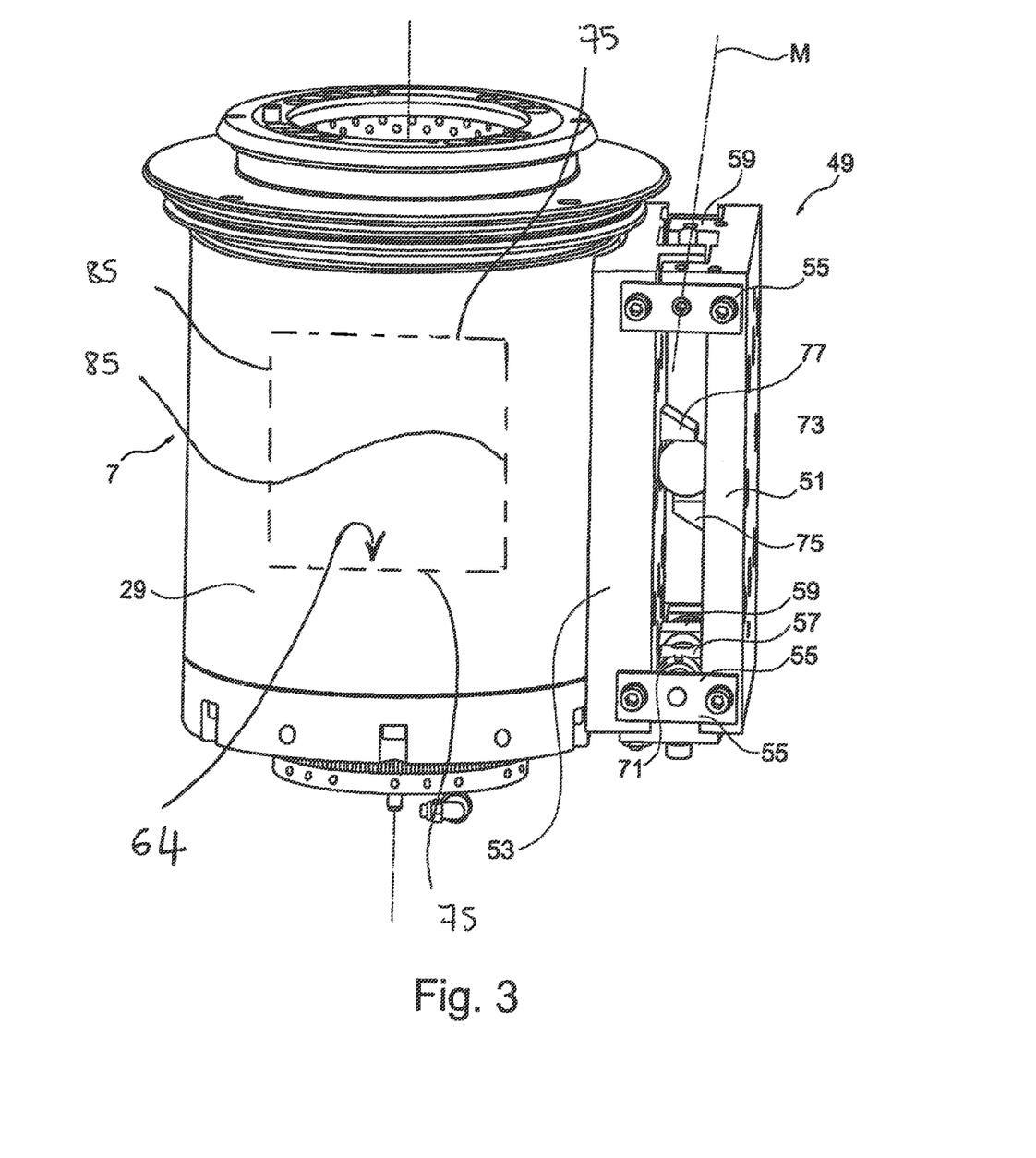
FIG. 3 is a perspective view of an exemplary embodiment, with the spindle locking mechanism indicated.

The above-mentioned spindle mount 49 is not visible because in FIG. 4, it is hidden by the spindle unit 7, also see FIG. 3.

The drawing also clearly shows the first clamping jaw unit 67 mounted on the spindle unit and the first clamping strip unit 68 that interacts with it, which is attached to the base of the machine 1. Ideally, a dovetail mount or a comparable attachment, which can be easily detached in order to remove the spindle unit and can subsequently be precisely reattached, is selected for attaching the clamping jaw unit to the spindle unit.

The first clamping jaw unit 67 supports first pivoting strips 69, each of which is elastically affixed to the base of the clamping jaw unit 67 by means of its respective holding slat, which in this case is embodied in the form of a thin, continuous, or locally interrupted strip. Instead of an elastic holding slat of this kind, for example a corresponding hinge could also be used, but such an embodiment is inferior to the elastic holding slat in terms of precision over the long run. The pivoting strips in this case are composed of elongated, straight strips with flat clamping surfaces, whose longitudinal axes extend perpendicular to the plane of the drawing of FIG. 4, i.e. perpendicular to the spindle rotation axis 9.

The clamping jaw unit 67 also supports strip-like first abutments 71, which cooperate with the pivoting strips 69 in the clamping operation and also have flat clamping surfaces and, together with the first pivoting strips, form a first clamping jaw.

Preferably accommodated directly in the clamping jaw unit 67 itself, there is a cylinder 72 in which a piston 73 travels, which is pneumatically actuated in a suitable fashion and comprises the actuator in the present exemplary embodiment. Its piston rod is coupled to a curved diaphragm 74, which is suitably composed of metal or spring steel and which in at least some sections is linked at its outer ends to the pivoting strips 69 and whose function will be explained in greater detail below. The diaphragm is thin enough to be deflected by more than merely an insignificant amount in the direction perpendicular to its main area and is thick enough to be able to exert and transmit forces in the direction of its main area, which forces cause the pivoting strips to come to rest in a reliably clamped fashion against the clamping strips and the abutment. To make sure that the selective action of the piston rod does not locally overload the flat diaphragm 74, causing it to deform unevenly, the piston rod preferably acts on the diaphragm 74 by means of a support strip 76 that increases the local strength of the diaphragm 74.

As an alternative to the diaphragm 74, it is also possible to use two rigid plates, which are connected in an articulating fashion to the actuator or support strip 76 and to the pivoting strips 69. The first clamping strip unit 68 has two first clamping strips 75. The clamping strips 75 are advantageously composed of spring steel. In this case, they are elongated, straight strips whose longitudinal axes extend perpendicular to the plane of the drawing of FIG. 4, i.e. perpendicular to the spindle rotation axis 9.

The free ends of the clamping strips are far enough from their base points that they center themselves between the pivoting strips and abutments through elastic deformation, without exerting significant forces on the spindle unit.

FIG. 4 shows the spindle locking mechanism in the inactive, i.e. released, state. In this exemplary embodiment, the diaphragm is embodied so that it is released in the position shown in FIG. 4. In this state, between the first pivoting strips 69 and their first abutments 71, there is an open groove extending perpendicular to the plane of the drawing, into which the corresponding first clamping strip protrudes with play, without coming into contact with the respective pivoting strip or the respective abutment during the measurement (i.e. when the spindle unit 7 executes a low amplitude motion under the influence of the imbalance). The spindle unit 7 therefore has complete freedom of movement when the spindle locking mechanism 64 is inactive. In this case, the maximum width of the groove is only 0.5 mm to 0.05 mm, preferably approximately 0.15 mm, in a direction perpendicular to the longitudinal direction of the groove. The respective clamping strip is correspondingly small.

The spindle locking mechanism 64 is activated before the material removal device 65 starts to act on the work piece. To this end, the first piston 73 is acted on with compressed air so that it moves in the direction of the first diaphragm 74. Once the edges of the diaphragm are immobilized against the first pivoting strips 69, the piston movement brings the diaphragm closer and closer to its elongated, flat state. As a result, the diaphragm acts on the pivoting strips 69 with a compressive force that causes the pivoting strips 69, through elastic deformation of their holding slats 70, to pivot toward the abutments 71. This ends up causing the first clamping surfaces 75a, 75b of each first clamping strip 75 to be clamped with great force between a respective first pivoting strip 69 and a respective first abutment 71 or more precisely stated, between their clamping surfaces. The latter occurs because diaphragm 74 functionally constitutes a force-displacement converter that converts the comparatively slight actuating force that the piston 73 exerts along its comparatively long piston stroke into a clamping force that is powerful compared to the actuating force of the piston, but acts only on the path that is short compared to the piston stroke until the pivoting strips, with the interposition of the clamping strips, reach the end of their flex when they come to rest against the abutment. Instead of using the preferred diaphragm, such a force-displacement converter could also be implemented, for example, in the form of a rod assembly or a kind of toggle joint, which, as soon as the piston moves, pushes the pivoting strips in a way that corresponds to the action of the diaphragm.

To deactivate the spindle locking mechanism again, the working chamber of the piston 73 is once again depressurized so that the diaphragm 74, due to its inherent restoring forces and possibly also due to the restoring forces of the pivoting strips, returns to its relaxed position again, which releases the clamping action. Alternatively, the piston can also be embodied as bidirectionally actuatable and can be triggered so that it actively pushes the diaphragm back into its relaxed position.

The key point in all of this is that the first clamping strips are embodied as flexible in the direction of the rotation axis of the spindle. As a result of this, in the course of immobilizing the spindle unit, the locking device 64 does not produce any forces that displace the spindle unit and thus exert stress on the sensor arrangement 61, even if the clamping surfaces 75a and 75b are not exactly centered when the spindle locking mechanism is inactive, i.e. if the clamping strips are not situated in the middle of the gap between their respective pivoting strip 69 and abutment 71. This latter circumstance occurs constantly in actual use due to the ever-present phenomenon of thermal expansion, even in machines that have been produced with great precision like the balancing machines described here.

A decisive factor is that in such a case, the clamping strips are subjected to the elastic deformation to such an extent that they neatly come into contact with the pivoting strips and their abutments, without any significant forces being transmitted to the spindle unit; any slight forces possibly produced due to the elastic deformation act in a direction parallel to the rotation axis of the spindle. These forces are thus easily absorbed by the spindle mount 49 whose leaf spring elements 55 powerfully resist forces in this direction, thus reliably keeping such forces away from the sensor body 61.

At the same time, the first clamping strips in turn are each embodied so that they are relatively stiff in the direction of forces perpendicular to the rotation axis of the spindle that are produced by the action of the material removal device on the work piece or test piece 17 to be balanced. In addition, the two first clamping strips that act in the same direction are mounted far enough apart from each other; this also increases the (combined) stiffness or resistance with which a tilting of the spindle unit can be counteracted.

Figure 6:
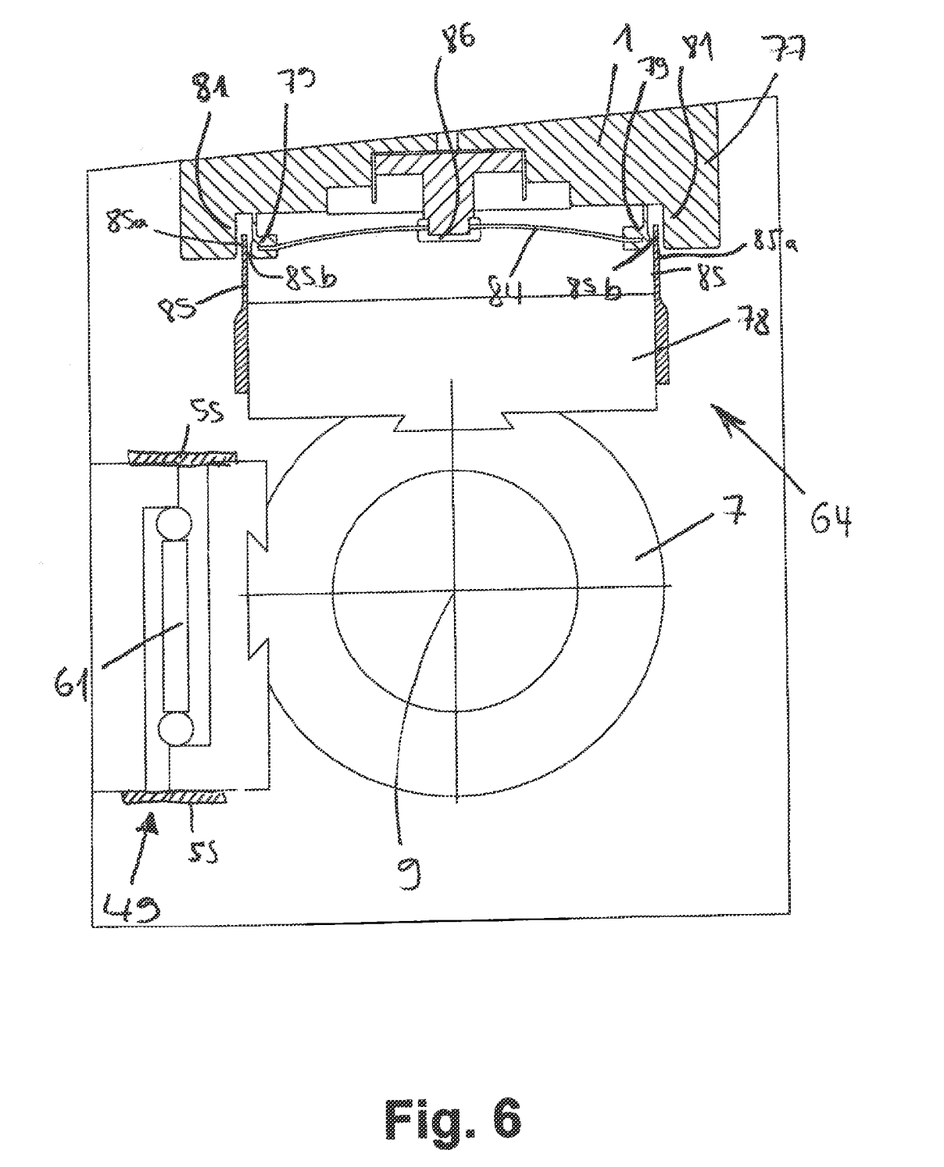
FIG. 6 shows a top-view cross section through the first exemplary embodiment, with only a second part of the spindle locking mechanism shown (in the released state).
Figure 7:
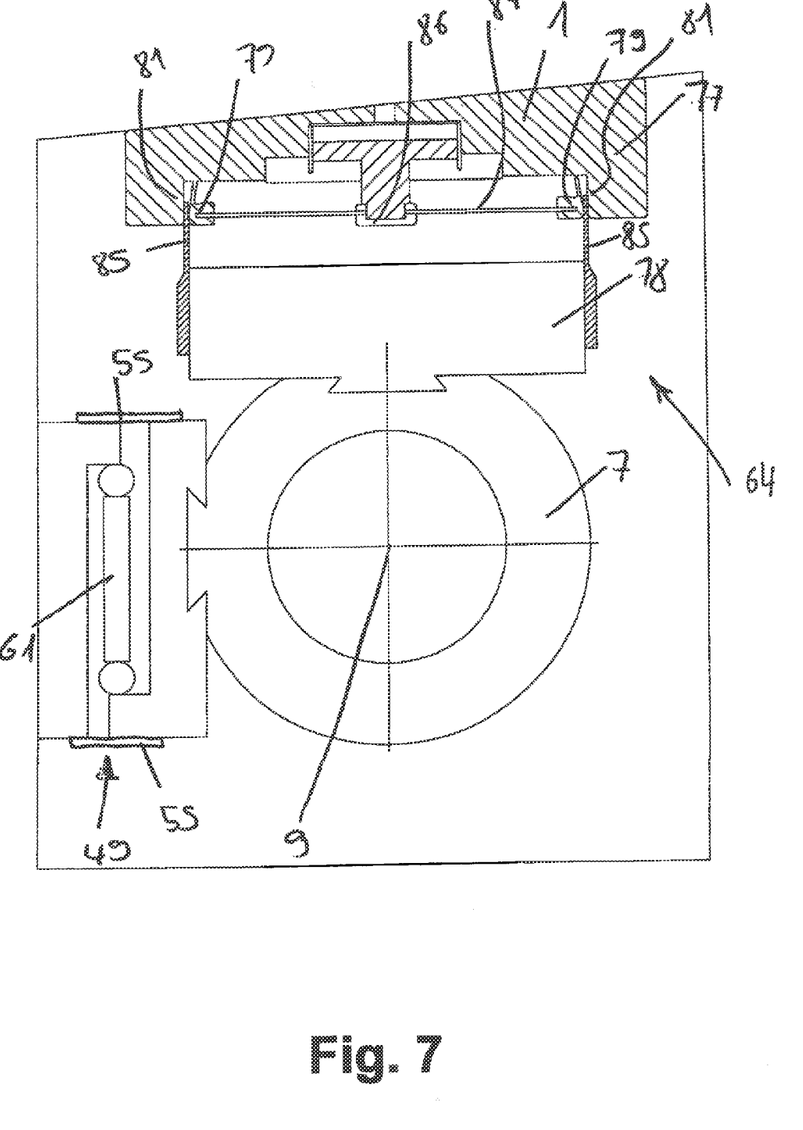
FIG. 7 shows a top-view cross section through the first exemplary embodiment, with only a second part of the spindle locking mechanism shown (in the clamped state).

The above-described first clamping jaw unit and the above-described first clamping strip unit do not have to absorb the forces generated by the material removal device all by themselves, but are instead assisted in this function by a second clamping jaw unit 77, which is shown in FIGS. 6 and 7, and by a second clamping strip unit 78. These two second clamping jaw units 77, 78 are basically embodied in exactly the same way as the first clamping jaw units 67, 68 described above so that the descriptions given for the two first units correspondingly apply to the two second clamping jaw units, except for the differences described below.

The second clamping jaw unit 77 is preferably attached to the base of the machine 1 rather than to the spindle unit 7. The second clamping strip unit 78, on the other hand, is preferably attached to the spindle unit 7 or to the first clamping jaw unit 67 rather than to the base of the machine 1; ideally, a dovetail mount or comparable attachment is selected for this purpose, which can be easily detached in order to remove the spindle unit. In addition, the second clamping jaw unit 77 and the second clamping strip unit 78 are ideally rotated by 90° relative to the first clamping jaw unit 67 and the first clamping strip unit 68, respectively, so that the second clamping surfaces 85a, 85b and the longitudinal axes of the second clamping strips 85 extend parallel to the rotation axis 9 of the spindle 1.

The second clamping strips 85 are elastic in a direction perpendicular to the rotation axis 9 of the spindle 1 and perpendicular to the measurement direction M of the sensor device 61. In cases in which—as in this exemplary embodiment—a spindle mount 49 with leaf-spring elements 55 is used, the clamping strips 85 are thus flexible in a direction that is parallel to the longitudinal axes of the leaf springs 55 (that extend horizontally in this exemplary embodiment). The slight forces produced by the elastic deformation of the clamping strips 85 are thus easily absorbed by the leaf springs 55 and are thus kept away from the sensors 61.

Figure 8:
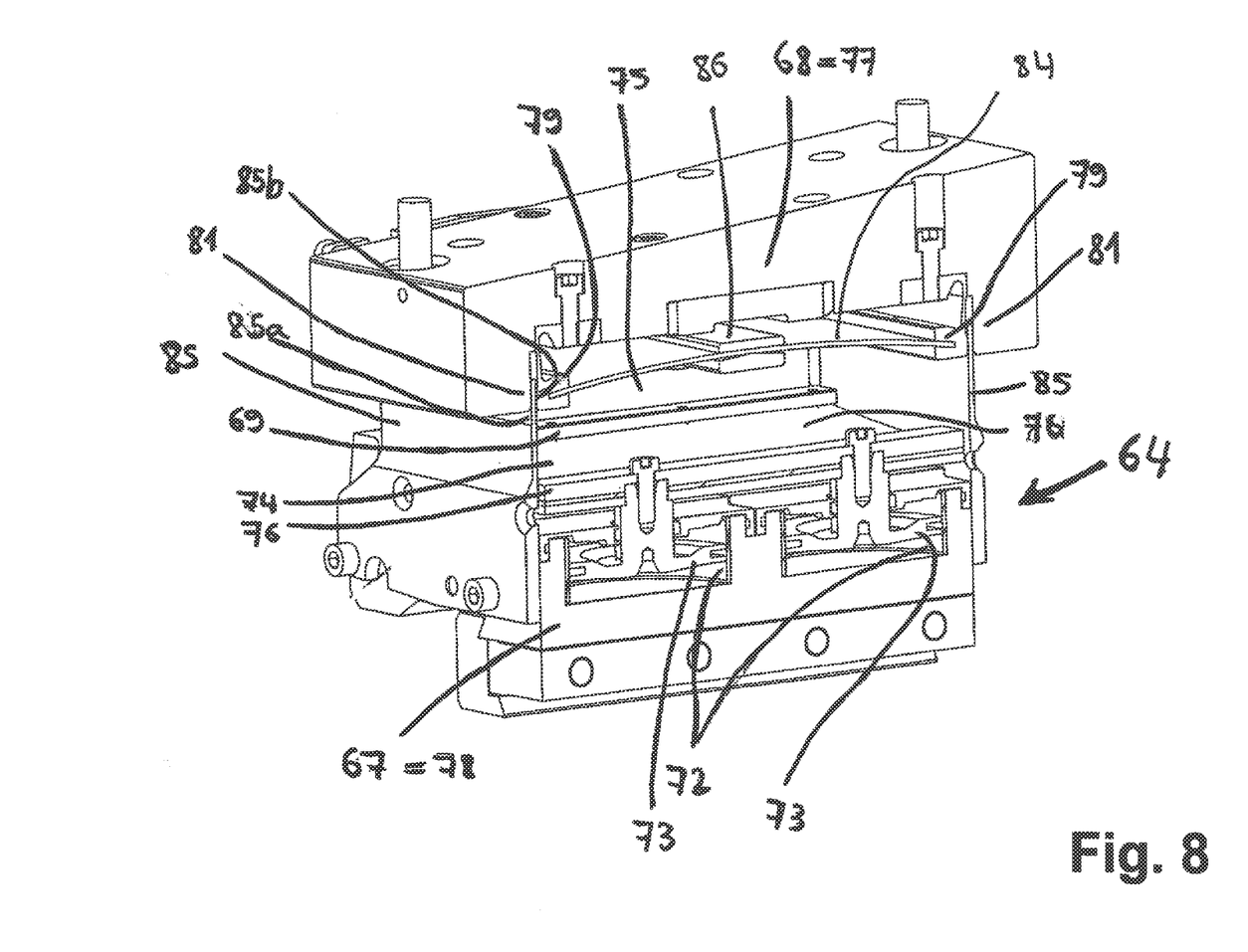
FIG. 8 shows a perspective cross section through a second exemplary embodiment of (only) the spindle locking mechanism according to the invention.

FIG. 8 will now be used to give an additional overview of the above descriptions—FIG. 8 shows a variant of the spindle locking mechanism 64 that is slightly modified, but which differs from the first variant described above only in that the actuator is embodied in the form of a twin piston unit instead of the single piston; otherwise, it is identical to the first variant.

FIG. 8 shows the first clamping jaw unit 67 mounted on the spindle side, with its two cylinders 72 and their two pistons 73, which act on the first diaphragm 74 by means of a support strip 76. It also shows how the first diaphragm is attached to one of the two first pivoting strips 69, behind which one of the first clamping strips 75 is visible.

The drawing also shows the two second clamping strips 85 with their clamping surfaces 85a and 85b that are each clamped between the respective second pivoting strip 79 and the associated second abutment 81, in the same manner as described above for the first abutment.

The two second clamping strips are attached to the end surfaces of the first clamping jaw unit so that the base of the first clamping jaw unit simultaneously functions as the base of the second clamping strip unit, which is why the ensemble composed of the second clamping strips 85 and the base of the first clamping jaw unit can be referred to as the second clamping strip unit 78, so that a functional integration is achieved to the effect that the first clamping jaw unit 67 simultaneously constitutes the second clamping strip unit 78 and vice versa. The same is true of the first clamping strip unit 68 mounted on the base of the machine, which is functionally combined with the second clamping jaw unit 77.

FIG. 8 also gives a very clear depiction of the second diaphragm 84, which in this case likewise has a force exerted on it via a second support strip 86 by a correspondingly arranged tandem piston unit that is not shown in detail.

It is clear from this that clamping strips combine to form a rectangle, which has a high moment of inertia in the clamped state and thus holds the spindle unit rigidly—almost as though the spindle unit were anchored to a rectangular box girder.

A slightly different clamping strip arrangement can conceivably also be used as an alternative, possibly so that the clamping strips combine to form a triangle or circle. But in terms of forces, the most advantageous arrangement and the one that is the simplest to control from a production standpoint is the one in which the clamping strips are arranged in the form of a rectangular box.

Figure 9:
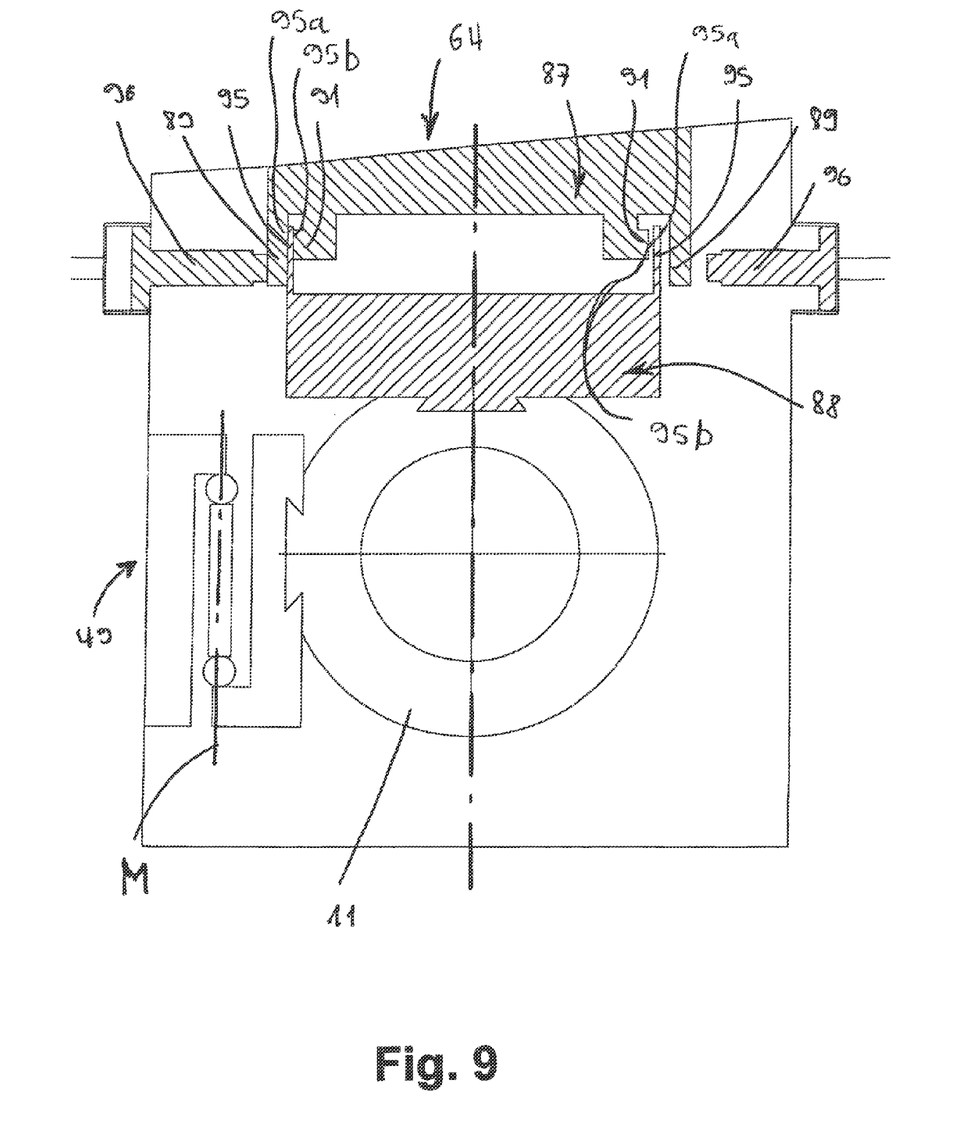
FIG. 9 shows a top-view cross section through a third exemplary embodiment of the spindle locking mechanism according to the invention.
Figure 10:
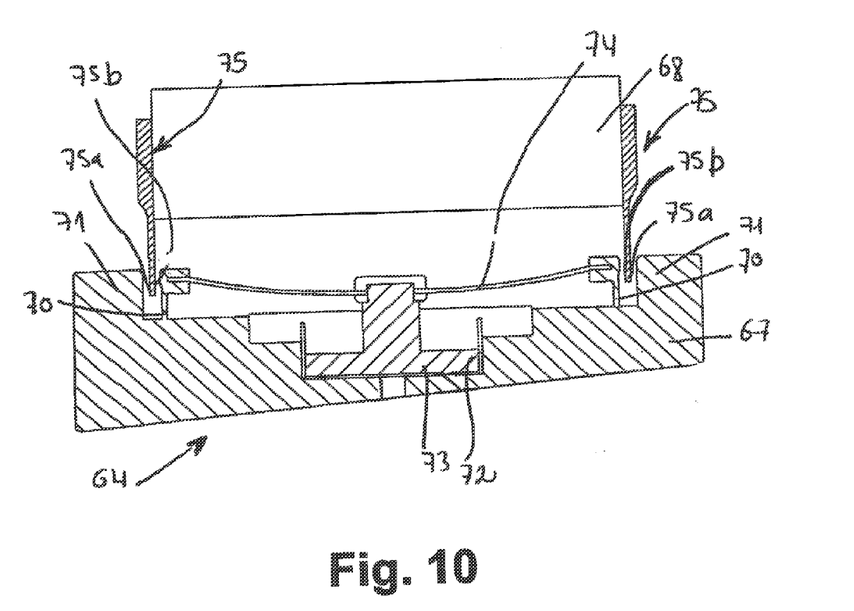
FIGS. 10 and 11 show two more cross sections through the first exemplary embodiment of the spindle locking mechanism according to the invention and are provided for further illustration.
Figure 11:
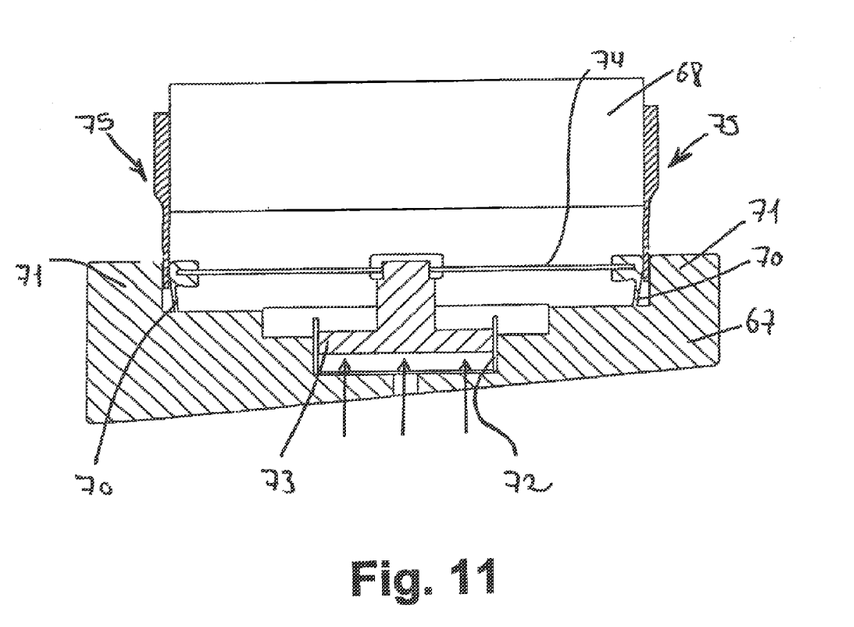

FIG. 9 shows an alternative embodiment, in which instead of a piston or tandem piston unit driven by compressed air with the interposition of a force-displacement converter, hydraulically driven pistons are used as actuators, which by nature exert powerful forces and thus clamp the clamping strips between the pivoting strips and the abutments.

A third exemplary embodiment differs from the two exemplary embodiments described above only due to the cooperation between its diaphragm 74 and its actuator, which is composed of the pneumatically actuated piston 73 and its cylinder 72. In this exemplary embodiment as well, the latter are also embodied so that the piston pushes the diaphragm into an (at least essentially) fully extended position in order to clamp the clamping strips between the pivoting strips and the abutments. Unlike in the other exemplary embodiments, the diaphragm is not merely returned or "released" into its relaxed position in order to release the clamping strips, but is instead actively deformed in the opposite direction by the piston, i.e. is conveyed into a position in which the diaphragm edges attached to the pivoting strips are even closer to each other than when diaphragm is relaxed. As a result of this, for example, pivoting strips of the kind shown in FIG. 4 can be forced into a position in which they are arched inward toward the center of the diaphragm so that they do not simply assume the relaxed position shown in FIG. 4. This makes it possible to increase the degree of freedom of movement that exists when the spindle locking mechanism is deactivated.

The manual or (routinely) automatic control of the balancing machine is preferably embodied so that a clamping is not produced at all of the clamping strips at the same time, but is instead intentionally produced at one clamping strip after the other.

In a balancing machine whose spindle mount 49 uses leaf springs 52 to support the spindle unit in pivoting fashion on the machine frame 1 with the interposition of at least one sensor 61, the clamping is normally first produced at the clamping strips that are flexible or movable in the horizontal direction. This is because the leaf springs 55 are particularly stiff in this direction and are thus easily able to absorb the slight horizontal forces generated in the course of producing the clamping action on the clamping strips, without compromising precision.

Once this first clamping is produced, the spindle unit is already stabilized or fixed in the vertical direction by the spindle locking mechanism so that then, the clamping can be produced on the clamping strips that are flexible in the vertical direction. The vertical forces produced due to the elastic deformation of the clamping strips are already being absorbed by the clamping strips of the spindle locking mechanism that were clamped first and these forces therefore cannot exert any influence on the spindle mount 49 or on the sensor or sensors 61.

The embodiment of the spindle locking mechanism according to the invention makes it possible to simply monitor whether the spindle unit has its full freedom of movement during the imbalance measurement—a simple measurement of the electrical resistance between the clamping strips on the one hand and the pivoting strips and their abutments on the other indicates whether the required full freedom of movement is present. To this end, the clamping strips and the pivoting strips and/or abutments are mounted in an electrically insulated fashion and are acted on with a voltage so that in the end, a resistance can only be measured between them if the clamping surfaces with which the above-mentioned parts rest against each other in the clamped state are touching at least lightly.

It should also be noted that the invention can be used equally well in the (rare) cases in which the balancing is carried out by depositing material onto the test piece.

The invention claimed is:

1. A balancing device, comprising:
   a measuring device for determining a rotational imbalance of a test piece;
   a spindle unit with a spindle that is embodied to hold the test piece and permit the test piece to rotate at a testing speed;
   a spindle mount by which the spindle unit is anchored to a base of a machine in a moving fashion so that the spindle unit is able to oscillate in a predetermined measurement direction due to imbalance forces occurring during the measurement operation;
   at least one sensor, which during rotation of the spindle, detects at least one imbalance variable occurring in the measurement direction; and
   a material removal device for balancing, the test piece by removing material from a predetermined location;
   wherein the measuring device and material removal device are embodied so that it is possible to carry out the material removal while the test piece is being held in the spindle; and further comprising:
   a spindle locking mechanism, which makes it possible to immobilize the spindle unit without a force produced by this immobilizing action exerting any stress on the spindle mount or at least without this force exerting any stress on the sensor or sensors so that the forces generated by the material removal device do not cause the spindle unit to move.

2. The balancing device as recited in claim 1, wherein the spindle locking mechanism engages the circumference of the spindle unit on only one side.

3. The balancing device as recited in claim 1, wherein the spindle locking, mechanism includes clamping surfaces on which at least one openable and closable clamping jaw acts, in which the at least one clamping jaw and/or the clamping surfaces are embodied as articulated or flexible so that the at least one clamping jaw, when acting on the clamping surfaces, does not exert any force on the spindle unit or exert any stress on the least one sensor.

4. The balancing device as recited in claim 3, wherein the clamping surfaces are embodied as flexible clamping strips.

5. The balancing device as recited in claim 4, wherein at least two clamping strips are provided, which are arranged in different planes.

6. The balancing device as recited in claim 4, wherein at least two clamping strips are provided, which are arranged parallel to and spaced apart from each other.

7. The balancing device as recited in claim 3, wherein each clamping jaw includes a pivoting strip that has an elastically deformable holding slat around which the pivoting strip is pivoted against a clamping strip in the course of the actuation of the clamping jaw.

8. The balancing device as recited in claim 7, wherein at least two clamping jaws are actuated by a shared actuator.

9. The balancing device as recited in claim 8, wherein the actuator actuates the at least one pivoting strip associated with it, with the interposition of a force-displacement converter that deflects the actuating force, which is exerted b the actuator in a first effective direction, into a second, different effective direction, before imparting it to the pivoting strip and thus simultaneously converts the lesser force exerted by the actuator along a longer path to a greater force acting along a shorter path.

* * * * *